United States Patent [19]

Cleven

[11] Patent Number: 5,319,196

[45] Date of Patent: Jun. 7, 1994

[54] OPTICAL ROTATION SENSOR

[75] Inventor: Ronald D. Cleven, Huntertown, Ind.

[73] Assignee: Magnavox Electronic Systems Company, Fort Wayne, Ind.

[21] Appl. No.: 986,321

[22] Filed: Dec. 7, 1992

[51] Int. Cl.$^5$ .............................................. G01D 5/34
[52] U.S. Cl. .......................... 250/231.13; 250/227.11
[58] Field of Search .................... 250/231.13, 231.14, 250/231.16, 227.11, 227.21; 385/43

[56] References Cited

U.S. PATENT DOCUMENTS

| | | | |
|---|---|---|---|
| 3,901,581 | 8/1975 | Thiel | 385/43 |
| 4,072,399 | 2/1978 | Love | 385/43 |
| 4,500,870 | 2/1985 | Krohn et al. | 250/231.13 |
| 4,650,995 | 3/1987 | Tokunaga et al. | 250/231.13 |
| 4,893,007 | 1/1990 | Stannow et al. | 250/231.13 |
| 5,214,278 | 5/1993 | Banda | 250/231.13 |

Primary Examiner—David C. Nelms
Attorney, Agent, or Firm—John H. Crozier; Richard T. Seeger

[57] ABSTRACT

In a preferred embodiment, an optical rotation sensor for a rotating member, the optical rotation sensor including: at least one reflective element disposed on the surface of the rotating member; first light transmission means to transmit light from a light source, disposed at the proximal end of the first light transmission means remote from the rotating member, to illuminate the surface of the rotating member at the distal end of the first light transmission means; and second light transmission means to transmit from the distal end of the second light transmission means to a first photodetector, disposed at the proximal end of the second light transmission means remote from the rotating member, light reflected from the at least one reflective element as the at least one reflective element passes the distal end of the second light transmission means as the rotating member rotates.

15 Claims, 4 Drawing Sheets

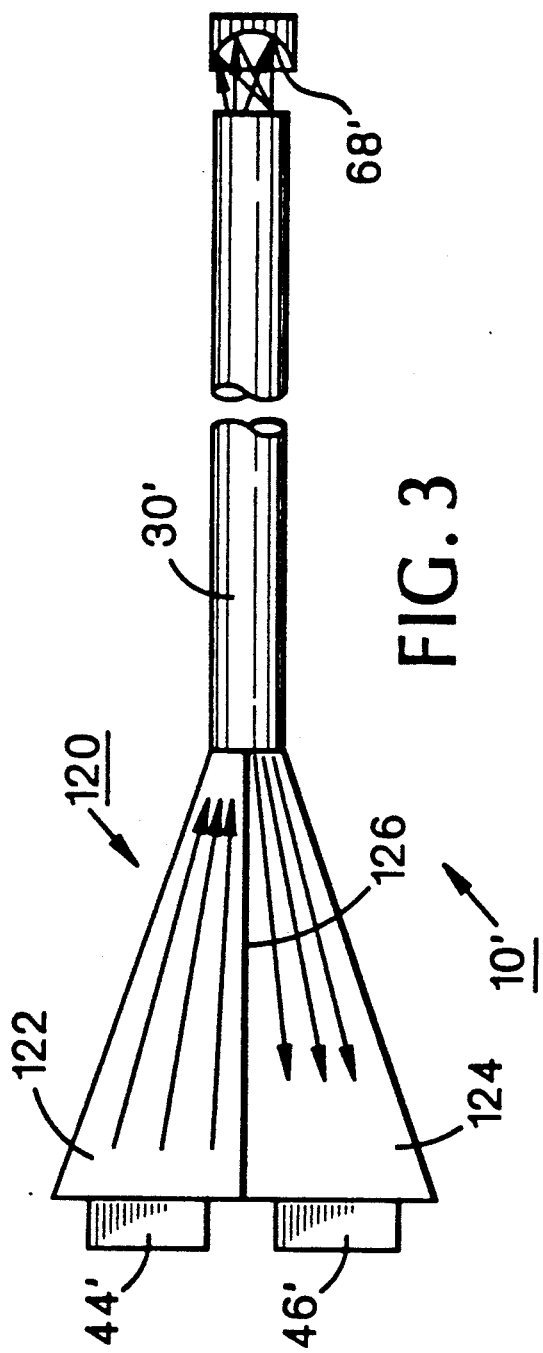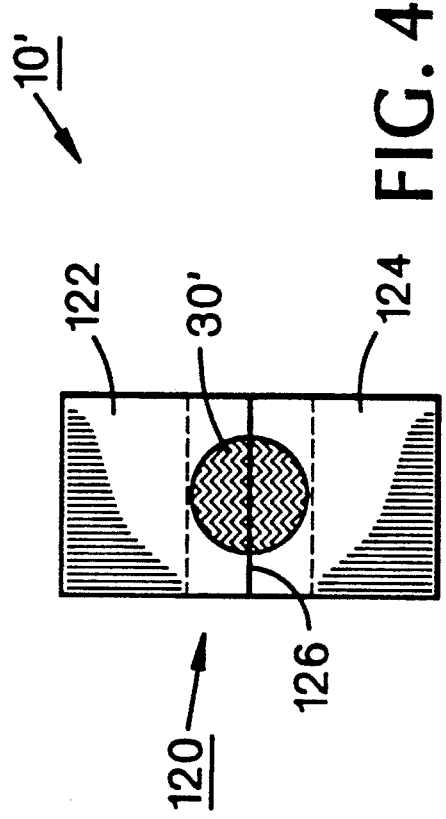

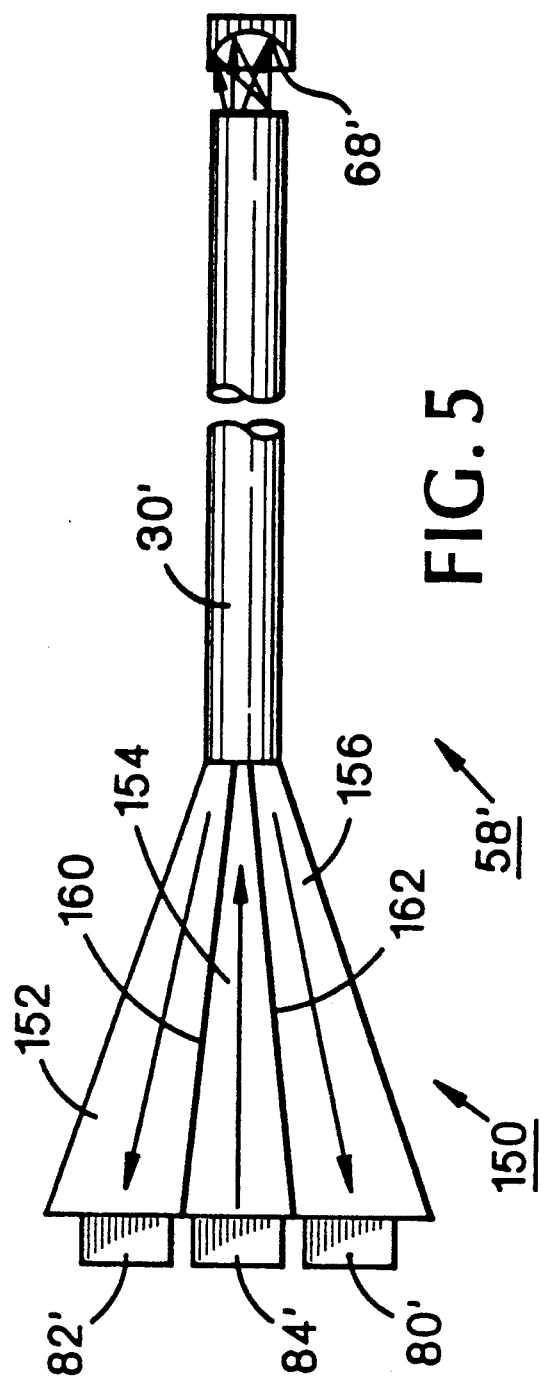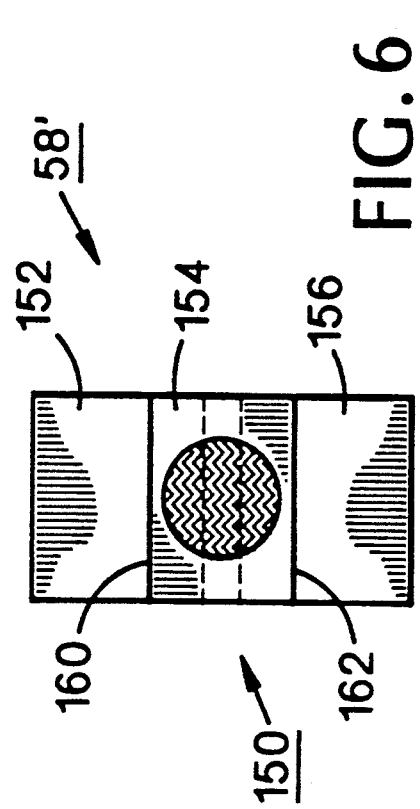

//5,319,196//

OPTICAL ROTATION SENSOR

BACKGROUND OF THE INVENTION

1. Field of the Invention

The present invention relates to rotation sensing devices generally and, more particularly, but not by way of limitation, to a novel optical sensor for the sensing of rate of rotation and direction of rotation of a rotating member, which sensor is particularly useful when the rotating member is disposed in a harsh environment such as a transmission.

2. Background Art

A need exists for sensing rotational movement and the rate and direction thereof in harsh environments such as in hot transmission casings. Typically, magnetic sensors have been used in such applications; however, in some cases, the magnetic sensors are not suitable at the high temperatures encountered and, in other cases, magnetic sensors do not provide the desired degree of resolution. Also, the use of magnetic sensors is limited when magnetic fields apart from those being sensed are present, such as the magnetic fields present in electric motors.

Accordingly, it is a principal object of the present invention to provide a rotation sensor that is usable when the rotating member is disposed in a harsh environment.

It is a further object of the invention to provide such a sensor that is capable of high resolution.

It is an additional object of the invention to provide such a sensor that can sense both rate and direction of rotation.

It is another object of the invention to provide such a sensor that is easily and economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an optical rotation sensor for a rotating member, said optical rotation sensor comprising: at least one reflective element disposed on the surface of said rotating member; first light transmission means to transmit light from a light source, disposed at the proximal end of said first light transmission means remote from said rotating member, to illuminate the surface of said rotating member at the distal end of said first light transmission means; and second light transmission means to transmit from the distal end of said second light transmission means to a first photodetector, disposed at the proximal end of said second light transmission means remote from said rotating member, light reflected from said at least one reflective element as said at least one reflective element passes said distal end of said second light transmission means as said rotating member rotates.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 3 is a side elevational view of a rotation sensor constructed according to an additional embodiment of the present invention.

FIG. 4 is an end elevational view of the embodiment of FIG. 3.

FIG. 5 is a side elevational view of a rotation sensor constructed according to a further embodiment of the present invention.

FIG. 6 is an end elevational view of the embodiment of FIG. 5.

DETAILED DESCRIPTION OF THE PREFERRED EMBODIMENTS

Reference should now be made to the drawings, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 1:
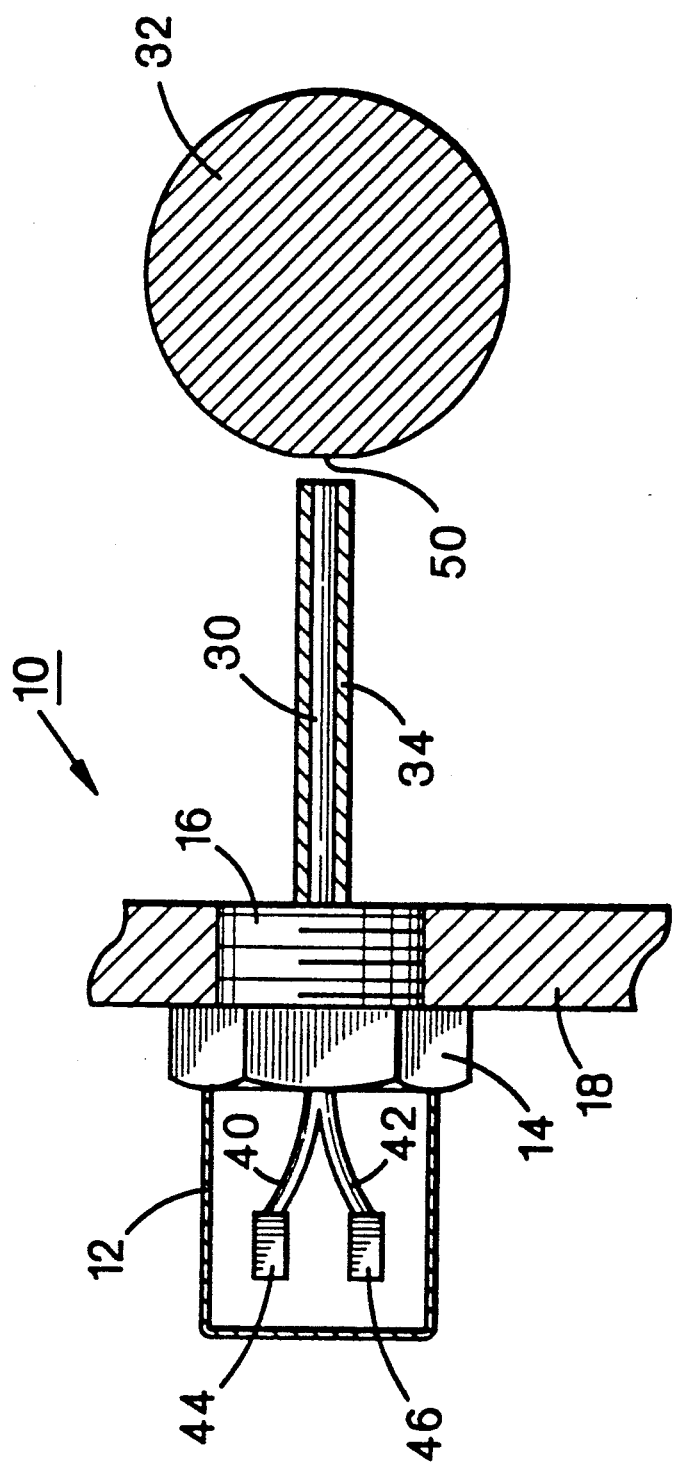
FIG. 1 is a fragmentary, side elevational view, partially in cross-section, of a rotation sensor constructed according to one embodiment of the present invention.

FIG. 1 illustrates a rotation sensor according to one embodiment of the present invention, the sensor being generally indicated by the reference numeral 10. Sensor 10 includes a housing 12 having a nut 14 at one end thereof and a threaded extension 16 which has been threadedly advanced into the wall of what may be assumed to be a transmission case 18. An optical fiber bundled glass rod 30 extends from the interior of housing 12 to a point in proximity to a rotatable shaft 32 in housing 12. The portion of glass rod 30 within transmission case 18 has a protective metal sheath 34 thereabout.

The proximal end of glass rod 30 is split into two portions 40 and 42, with the end of portion 40 adjacent a light emitter 44 and with the end of portion 42 adjacent a photodetector 46. A polished flat 50 is defined in the surface of shaft 32.

In use, light emitter 44 continuously illuminates the surface of shaft 32 through the optical fibers which comprise portion 40. Each time flat 50 passes the distal end of glass rod 30, the light will be reflected to that end and transmitted to photodetector 46 through the optical fibers which comprise portion 42. Thus, conventional electronic circuitry (not shown) associated with photodetector 46 can detect the rate of rotation of shaft 32. While the single flat 50 will give only one count per revolution, one can achieve almost limitless resolution by providing a large number of reflective elements disposed about the surface of shaft 32, within considerations of how much one wishes to invest in the optical and electronic elements.

A substantial advantage of the arrangement of sensor 10 is that there is nothing in transmission case 16 which cannot withstand high temperatures. Light emitter 44 and photodetector 44 and associated electronics are located outside transmission case 18 where they could be supplied with a stream of cooling air, if desired. The latter elements could also be located remotely from transmission case 16 by extending the length of glass rod 30. There are no limitations to the length of glass rod 30 or to the length of penetration thereof into transmission case 18.

The wavelengths of light produced by light emitter 44 can be selected to be effective in the particular lubricant used in transmission case 18.

Figure 2:
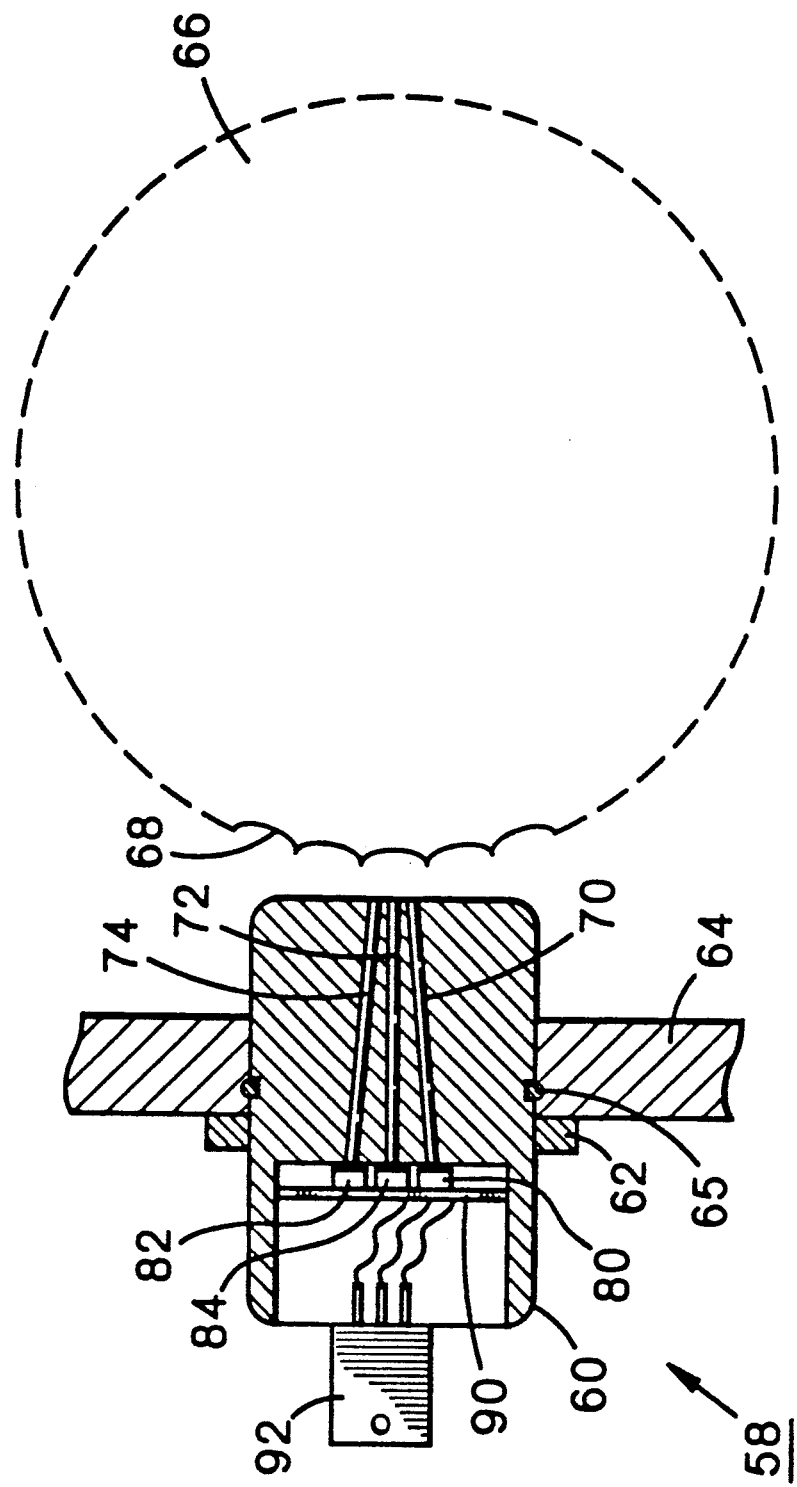
FIG. 2 is a side elevational view, partially in cross-section, of a rotation sensor constructed according to another embodiment of the present invention.

FIG. 2 illustrates a sensor constructed according to another embodiment of the present invention, the sensor being generally indicated by the reference numeral 58. Sensor 60 includes a flange 62 attached thereto, the sensor being shown as being mounted through the wall of what may be assumed to be a transmission case 64. An O-ring 65 is provided for sealing between sensor 60 and transmission case 64. The distal end of sensor 60 is in proximity to a shaft 66 disposed in transmission case 64, which shaft has a plurality of reflective elements, as at 68, circumferentially disposed about the periphery thereof, the reflective elements in this case being concavities defined in the surface of the shaft.

Three optical fiber bundled glass rods 70, 72, and 74 extend from the distal end of sensor 60 into the proximal end thereof outside transmission case 64. The proximal ends of glass rods 70 and 74 are adjacent photodetectors 80 and 82, respectively, while the proximal end of glass rod 72 is adjacent light emitter 84. Photodetectors 80 and 82 and light emitter 84 are mounted on a printed circuit board 90 which contains electronic circuitry associated with those elements and the printed circuit board is electrically attached to an external connector 92 mounted on the proximal end of sensor 60.

In use, light emitter 84 continuously illuminates the surface of shaft 66, while photodetectors 80 and 82 detect reflections from reflective elements 68. Rate of rotation is determined as described above with reference to sensor 10. However, in this case, the distal ends of glass rods 70 and 74 are disposed in quadrature with respect to the period of reflective elements 68 so that direction of rotation can be determined by detecting which output of one of photodetectors 80 and 82 is leading the output of the other of the photodetectors.

The advantages of sensor 10 described above are equally applicable to sensor 58 and the electronic elements of the latter can be separated from transmission case 64 by extending the lengths of glass rods 70, 72, and 74 to any desired degree.

FIGS. 3 and 4 illustrate a sensor constructed according to an additional embodiment of the present invention, the sensor being generally indicated by the reference numeral 10' and being generally similar to sensor 10 (FIG. 1). Sensor 10' includes an optical fiber bundled glass rod 30' having a distal end in proximity to a reflective element 68' similar to reflective elements 68 on FIG. 2.

Rather than splitting the proximal end of glass rod 30' as was done with glass rod 30 (FIG. 1), an injection molded launcher, generally indicated by the reference numeral 120, is disposed between the proximal end of glass rod 30' and a light emitter 44' and a photodetector 46'. Launcher 120 has upper and lower truncated wedge shaped portions 122 and 124, respectively, extending between light emitter 44' and photodetector 46', at the wide ends of the wedge shaped portions and glass rod 30' at the narrow ends of the wedge shaped portions. Upper and lower portions 122 and 124 have a reflective interface 126 disposed therebetween.

As can be seen on FIG. 3, upper wedge shaped portion 122 funnels light from light emitter 44' to the upper half of glass rod 30', while lower wedge shaped portion 124 transmits reflected light from the lower half of glass rod 30' to photodetector 46'. Sensor 10' can be easily and economically constructed in quantity.

FIGS. 5 and 6 illustrate a further sensor constructed according to the present invention, the sensor being generally indicated by the reference numeral 58' and being generally similar to both sensor 58 (FIG. 2) and sensor 10' (FIGS. 3 and 4). As with sensor 10' (FIGS. 3 and 4), sensor 58' includes a launcher, generally indicated by the reference numeral 150. Launcher 150 includes upper, middle, and lower truncated wedge shaped portions 152, 154, and 156 respectively, extending between a photodetector 82', a light emitter 84', and a photodetector 80' at the wide ends of the wedge shaped portions and the proximal end of glass rod 30' at the narrow ends of the wedge shaped portions. A first reflective interface 160 is disposed between wedge shaped portions 152 and 154 and a second reflective interface 162 is disposed between wedge shaped portions 154 and 156.

Sensors 10, 58, 10', and 58' can be constructed of any conventional materials suitable for the environments which they will encounter.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An optical rotation sensor for a rotating member, said optical rotation sensor comprising:
    (a) at least one reflective element disposed on the surface of said rotating member;
    (b) first light transmission means to transmit light from a light source, disposed at the proximal end of said first light transmission means remote from said rotating member, to illuminate the surface of said rotating member at the distal end of said first light transmission means;
    (c) second light transmission means to transmit from the distal end of said second light transmission means to a first photodetector, disposed at the proximal end of said second light transmission means remote from said rotating member, light reflected from said at least one reflective element as said at least one reflective element passes said distal end of said second light transmission means as said rotating member rotates; and
    (d) said at least one reflective element comprises an arcuate concavity disposed in said surface of said rotating member.

2. An optical sensor, as defined in claim 1, wherein said first and second light transmission means comprise glass rods.

3. An optical sensor, as defined in claim 1, wherein said first and second light transmission means comprise first and second portions of an optical fiber bundled glass rod.

4. An optical sensor, as defined in claim 3, wherein said proximal end of said glass rod is split into two halves, with the end of one half disposed adjacent said light source and the end of the other half disposed adjacent said first photodetector.

5. An optical sensor, as defined in claim 1, further comprising:
   (a) third optical transmission means to transmit from the distal end of said third light transmission means to a second photodetector, disposed at the proximal end of said third light transmission means remote from said rotating member, light reflected from said reflective element as said reflective element passes said distal end of said third light transmission means as said rotating member rotates; and
   (b) said distal ends of said second and third light transmission means being disposed in offset relationship such that the direction of rotation of said rotating member can be determined from outputs of said first and second photodetectors by detecting which output is leading the other.

6. An optical sensor, as defined in claim 1, further comprising:
   (a) said first and second light transmission means include upper and lower portions of a glass rod;
   (b) said first and second light transmission means include upper and lower truncated wedge shaped portions of a monolithic launcher, said upper wedge shaped portion extending between said upper portion of the proximal end of said glass rod at the narrow end of said upper wedge shaped portion and said light source at the wide end of said upper wedge shaped portion, and said lower wedge shaped portion extending between said lower portion of the proximal end of said glass rod at the narrow end of said lower wedge shaped portion and said photodetector at the wide end of said lower wedge shaped portion; and
   (c) said upper and lower wedge shaped portions being separated by a reflective interface.

7. An optical sensor, as defined in claim 6, wherein said glass rod comprises an optical fiber bundled glass rod.

8. An optical sensor, as defined in claim 5, further comprising:
   (a) said first, second, and third light transmission means include upper, middle, and lower portions of a glass rod;
   (b) said first and second light transmission means include upper, middle, and lower truncated wedge shaped portions of a monolithic launcher, said upper wedge shaped portion extending between said upper portion of the proximal end of said glass rod at the narrow end of said upper wedge shaped portion and said first photodetector at the wide end of said upper wedge shaped portion, said middle wedge shaped portion extending between said middle portion of the proximal end of said glass rod at the narrow end of said middle wedge shaped portion and said light source at the wide end of said middle wedge shaped portion, and said lower wedge shaped portion extending between said lower portion of the proximal end of said glass rod at the narrow end of said lower wedge shaped portion and said second photodetector at the wide end of said lower wedge shaped portion; and
   (c) said upper and middle wedge shaped portions and said middle and lower wedge shaped portions being separated by reflective layers.

9. An optical sensor, as defined in claim 8, wherein said glass rod comprises an optical fiber bundled glass rod.

10. An optical sensor, as defined in claim 1, wherein said rotating member is disposed in a transmission case, said first and second optical transmission means extend into said transmission case, and said light source and said photodetector are disposed externally of said transmission case.

11. An optical sensor, as defined in claim 5, wherein said rotating member is disposed in a transmission case, said first, second, and third optical transmission means extend into said transmission case, and said light source and said first and second photodetectors are disposed externally of said transmission case.

12. An optical rotation sensor for a rotating member, said optical rotation sensor comprising:
   (a) at least one reflective element disposed on the surface of said rotating member;
   (b) first light transmission means to transmit light from a light source, disposed at the proximal end of said first light transmission means remote from said rotating member, to illuminate the surface of said rotating member at the distal end of said first light transmission means;
   (c) second light transmission means to transmit from the distal end of said second light transmission means to a first photodetector, disposed at the proximal end of said second light transmission means remote from said rotating member, light reflected from said at least one reflective element as said at least one reflective element passes said distal end of said second light transmission means as said rotating member rotates;
   (d) said first and second light transmission means include upper and lower portions of a glass rod;
   (e) said first and second light transmission means include upper and lower truncated wedge shaped portions of a monolithic launcher, said upper wedge shaped portion extending between said upper portion of the proximal end of said glass rod at the narrow end of said upper wedge shaped portion and said light source at the wide end of said upper wedge shaped portion, and said lower wedge shaped portion extending between said lower portion of the proximal end of said glass rod at the narrow end of said lower wedge shaped portion and said photodetector at the wide end of said lower wedge shaped portion; and
   (f) said upper and lower wedge shaped portions being separated by a reflective interface.

13. An optical sensor, as defined in claim 12, wherein said glass rod comprises an optical fiber bundled glass rod.

14. An optical rotation sensor for a rotating member, said optical rotation sensor comprising:
   (a) at least one reflective element disposed on the surface of said rotating member;
   (b) first light transmission means to transmit light from a light source, disposed at the proximal end of said first light transmission means remote from said rotating member, to illuminate the surface of said rotating member at the distal end of said first light transmission means;
   (c) second light transmission means to transmit from the distal end of said second light transmission means to a first photodetector, disposed at the proximal end of said second light transmission means remote from said rotating member, light reflected from said at least one reflective element as said at least one reflective element passes said distal end of said second light transmission means as said rotating member rotates;

(d) third optical transmission means to transmit from the distal end of said third light transmission means to a second photodetector, disposed at the proximal end of said third light transmission means remote from said rotating member, light reflected from said reflective element as said reflective element passes said distal end of said third light transmission means as said rotating member rotates;

(e) said distal ends of said second and third light transmission means being disposed in offset relationship such that the direction of rotation of said rotating member can be determined from outputs of said first and second photodetectors by detecting which output is leading the other;

(f) said first, second, and third light transmission means include upper, middle, and lower portions of a glass rod;

(g) said first and second light transmission means include upper, middle, and lower truncated wedge shaped portions of a monolithic launcher, said upper wedge shaped portion extending between said upper portion of the proximal end of said glass rod at the narrow end of said upper wedge shaped portion and said first photodetector at the wide end of said upper wedge shaped portion, said middle wedge shaped portion extending between said middle portion of the proximal end of said glass rod at the narrow end of said middle wedge shaped portion and said light source at the wide end of said middle wedge shaped portion, and said lower wedge shaped portion extending between said lower portion of the proximal end of said glass rod at the narrow end of said lower wedge shaped portion and said second photodetector at the wide end of said lower wedge shaped portion; and (h) said upper and middle wedge shaped portions and said middle and lower wedge shaped portions being separated by reflective layers.

15. An optical sensor, as defined in claim 14, wherein said glass rod comprises an optical fiber bundled glass rod.

* * * * *